F. R. RICHARDS.
CARPET RAVELER.
APPLICATION FILED JUNE 15, 1911.
1,087,982.
Patented Feb. 24, 1914.
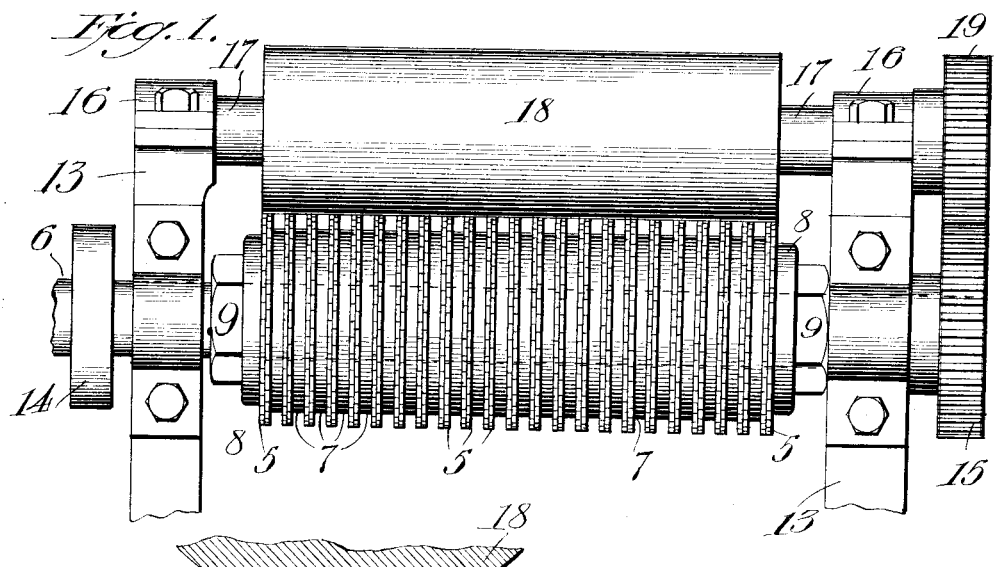
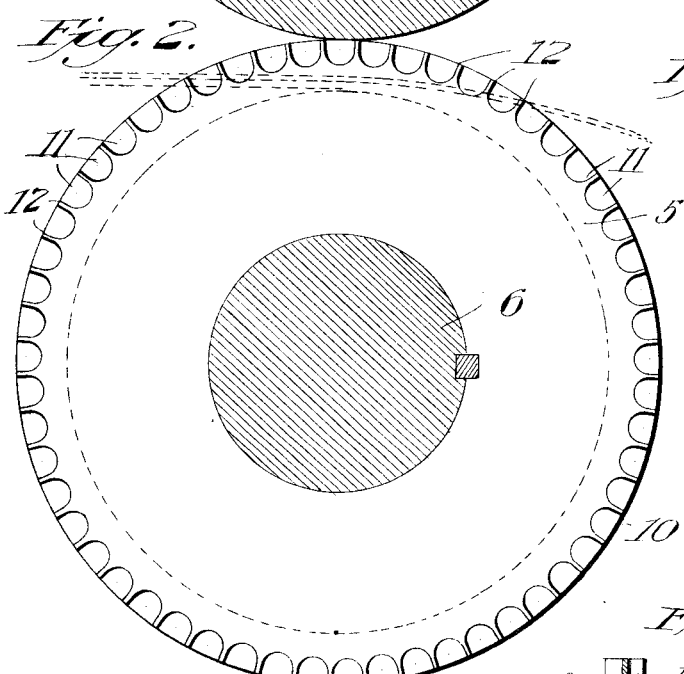
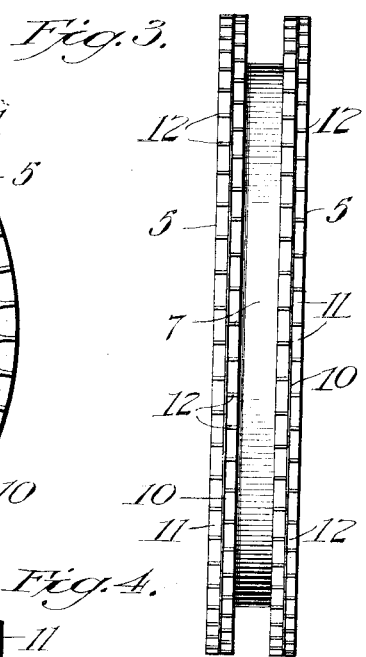
Inventor
Fredrick R. Richards,
Witnesses
By
Attorney

UNITED STATES PATENT OFFICE.

FREDRICK R. RICHARDS, OF ATCHISON, KANSAS.

CARPET-RAVELER.

1,087,982.

Specification of Letters Patent.

Patented Feb. 24, 1914.

Application filed June 15, 1911. Serial No. 633,403.

*To all whom it may concern:*

Be it known that I, FREDRICK R. RICHARDS, a citizen of the United States, residing at Atchison, in the county of Atchison and State of Kansas, have invented certain new and useful Improvements in Carpet-Ravelers, of which the following is a specification.

This invention relates to machines for cutting and raveling carpets and the principal object of the same is to produce a simple and economical cutting and raveling machine in which a novel built-up roll is formed of a plurality of relatively spaced disks equipped with peripheral cutting means and raveling teeth, and with which coöperates a combined pressure and backing roll that forms a rigid back support against which the carpet is held while being acted upon by said teeth.

One preferred and practical embodiment of the invention is shown in the accompanying drawings wherein—

Figure 1 is a view in front elevation of a carpet cutting and raveling machine constructed in accordance with this invention. Fig. 2 is an enlarged transverse sectional view of the cutting and raveling roll and the backing roll, the latter being shown fragmentarily. Fig. 3 is a view in elevation of two of the cutting and raveling disks. Fig. 4 is a fragmentary sectional view of the periphery of one of the cutting and raveling disks.

The improved carpet cutting and raveling machine is composed primarily of two rolls that are preferably arranged in superimposed relation, one roll being formed of a plurality of disks 5 that are retained in spaced relation on a shaft 6 by the interposed spacing rings or ferrules 7, said disks and rings being keyed or otherwise fastened on said shaft so that they are prevented from having rotary movement relative to said shaft, yet can be longitudinally moved thereon to permit their removal when necessary or desirable. The disks and rings may be held in operative assemblage by means of an abutment or shoulder 8 that engages one of the outer disks or rings, and a clamping nut 9 that engages the opposite outer disk or ring so that by manipulating said nut 9 the disks and rings will be forced in binding contact.

The disks 5 are duplicates and are preferably formed of hardened tool steel, and the periphery of each is provided with a central circumferential dividing cutting wall 10 and on each side of said wall, the periphery of the disk is provided with pockets 11 which may preferably, though not necessarily, be arranged in staggered relation, the outer ends of which form the raveling teeth 12.

The shaft 6 may be horizontally journaled in the vertical frame members or standards 13 with its ends projecting laterally beyond the same. One of the projected ends of the shaft 6 may be equipped with a pulley 14, so that the said shaft can have a belt connection with a source of power, not shown. The other projecting end of shaft 6 may be equipped with a gear wheel 15.

The standards 13 have been shown equipped with bearings 16 at their upper ends in which the end shafts 17 of a backing and pressure roll 18 are journaled. The roll 18 is solid and corresponds in length with the cutting and raveling roll and is in contact with the teeth of the disks 5, so that said teeth can effectively act upon the carpet that is fed between the two rolls. One of the shafts 17 may project beyond its bearing 16 and be equipped with a gear 19 that is in mesh with the gear 15 of the cutting and raveling roll, so that the two rolls will rotate in opposite directions.

The invention primarily resides in the two opposed rolls, one acting as a pressure and backing roll, the other serving to cut and ravel the carpet, and it will therefore be understood that the type of frame members 13 may be changed for other supports, and that the gear connections 15, 19 may be omitted for the reason that the passage of the carpet between the two contacting rolls will necessarily cause the same to rotate in opposite directions. It will also be understood that the pulley 14 may be omitted and any other convenient expedient resorted to for rotating shaft 6, or, if desired, power need not be applied to said shaft for the act of drawing the carpet therethrough will impart rotary movements to the two rolls.

It will be understood from the foregoing that this invention provides means for cutting a carpet into a plurality of strings or strips, the dividing walls 10 of the disks doing the cutting and the opposite sets of teeth 12 raveling the longitudinal edges of the strings or strips, that is, when the strings or strips emerge from the machine, their centers are not damaged but their longitudinal edges are raveled.

What I claim as my invention is:—

1. A carpet cutting and raveling machine including a backing and pressure roll formed with a substantially smooth surface, and a cutting and raveling roll mounted in coöperative relation to the backing and pressure roll, the said cutting and raveling roll being formed with a series of spaced circumferential cutting edges and with raveling teeth projecting laterally from opposite sides of each of the circumferential cutting edges, the said cutting edges and raveling teeth being adapted to act upon the carpet by pressure so as to stamp or cut the carpet into strips as the carpet is passed between the two rolls.

2. A carpet cutting and raveling machine including a backing and pressure roll formed with a substantially smooth surface, and a cutting and raveling roll mounted in coöperative relation therewith, the said cutting and raveling roll being formed with a plurality of spaced disks each of which is provided with a central circumferential cutting edge and with raveling teeth projecting laterally in opposite directions from the cutting edge and intersecting the cutting edge, the said circumferential cutting edge and raveling teeth being adapted to act upon the carpet by pressure and stamp or cut the same into strips as it is passed between the rolls.

In testimony whereof I hereunto affix my signature in the presence of two witnesses.

FREDRICK R. RICHARDS.

Witnesses:
W. P. WAGGENER,
WALTER E. BROWN.

Copies of this patent may be obtained for five cents each, by addressing the "Commissioner of Patents, Washington, D. C."